United States Patent [19]

Schnell et al.

[11] 4,359,892
[45] Nov. 23, 1982

[54] ARRANGEMENT FOR MEASURING SURFACE PROFILES

[75] Inventors: Axel Schnell, Aachen; Heinrich Oepen, Stolberg, both of Fed. Rep. of Germany

[73] Assignee: U.S. Philips Corporation, New York, N.Y.

[21] Appl. No.: 216,468

[22] Filed: Dec. 15, 1980

[30] Foreign Application Priority Data

Dec. 15, 1979 [DE] Fed. Rep. of Germany ....... 2950627

[51] Int. Cl.³ .............................................. G01B 5/28
[52] U.S. Cl. .................................. 73/105; 33/172 E; 310/332
[58] Field of Search ................. 73/105, 104; 310/331, 310/332; 33/147 N, 172 E

[56] References Cited

U.S. PATENT DOCUMENTS 2,728,222 12/1955 Becker et al. ......................... 73/105
4,310,913 1/1982 Miller ................................... 310/331

*Primary Examiner*—S. Clement Swisher
*Attorney, Agent, or Firm*—Robert T. Mayer; Bernard Franzblau

[57] ABSTRACT

A surface testing apparatus includes a bilaminar ceramic flexure element provided with means for generating a voltage which is proportional to the deflection of the flexure element. This voltage is compared with a reference voltage. After amplification the difference voltage is applied to the flexure element so that the applied force remains constant, independently of the deflection.

9 Claims, 4 Drawing Figures

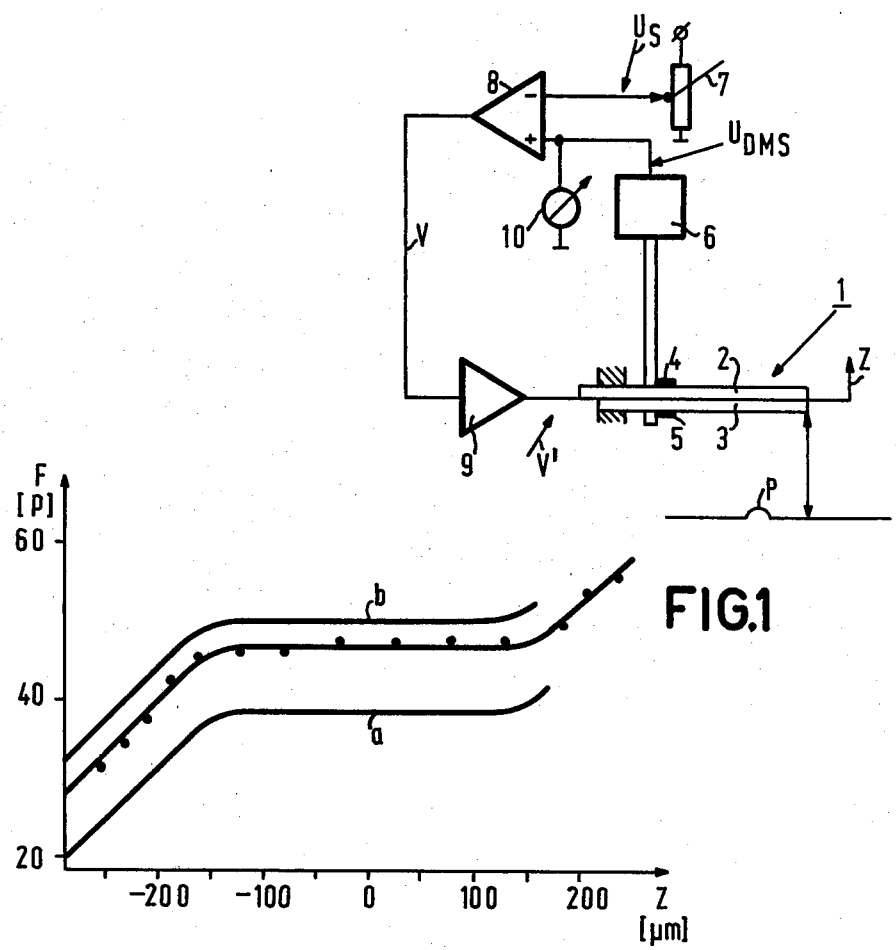
FIG.1
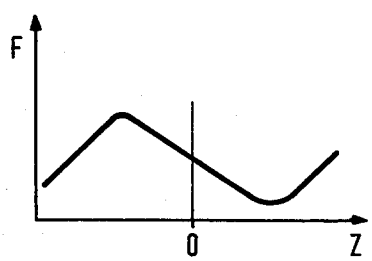
FIG.2a
FIG.2b
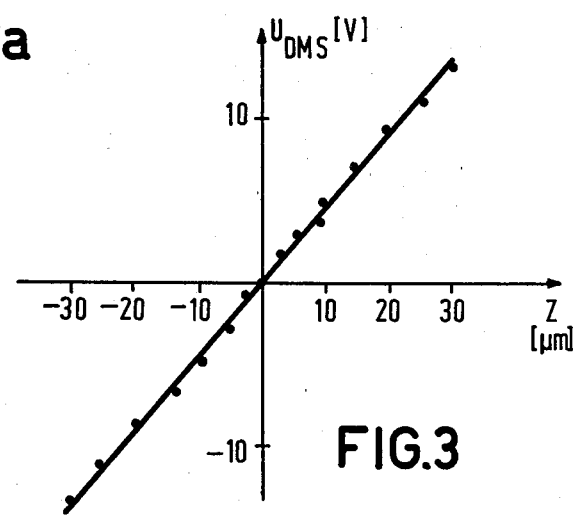
FIG.3

ARRANGEMENT FOR MEASURING SURFACE PROFILES

The invention relates to an arrangement for measuring surface profiles, in which voltages which are proportional to the deflections of a flexure element which is moved over the surface to be tested are applied to an indicator after being amplified.

Such arrangements are generally known, for example, from DE-PS No. 929 877 and from the article "Stand der Oberflächenprüfung", published in the magazine "Fachberichte für Oberflächentechnik", 1973, Vol. 1, pages 20 to 23. As flexure elements use is frequently made of piezoelectric elements, which enable a comparatively simple construction of the arrangement to be obtained. However, for many uses it is a disadvantage that the force of application is not constant but depends on the deflection. This limits their use, in particular for softer surfaces.

It is an object of the present invention to provide an arrangement of the type mentioned in the opening paragraph in which the force of application is constant, that is independent of the deflection. It is then particularly advantageous to make the force of application itself adjustable.

According to the invention this is achieved in that the flexure element is a bilaminar ceramic element which is provided with means for generating a voltage which is proportional to the deflection and which is compared with a reference voltage, and that after amplification the difference voltage is applied to the flexure element. Suitably, said voltage generating means comprise strain gauges.

The deflection thus produced causes the flexure element to yield in the direction of deflection so that the desired effect is obtained, namely to make the force of application independent of the deflection.

In order to enable the degree of compensation to be varied, it is effective to make the amplitude of the voltage applied to the flexure element adjustable, for example by varying the gain factor. It is also advantageous to make the reference voltage variable in order to enable the starting point of the compensation to be varied.

An embodiment of the invention will now be described in more detail with reference to the drawing. In the drawing:

FIG. 1 represents the basic construction of an arrangement in accordance with the invention, FIG. 2a represents the uniform force, as a function of the deflection, obtained by means of the arrangement in accordance with the invention, FIG. 2b represents a case of overcompensation, and FIG. 3 represents the relationship between the deflection and the voltage supplied by the strain gauges.

A bilaminar flexure element 1, which is fixed at one end, for example a piezo-electric element or a ceramic element of an electro-strictive ceramic material, is subject to a deflection Z when scanning a profile P. On both sides of the flexure element, near its point of fixation, strain gauges 4 and 5 are arranged which form part of a bridge circuit 6. A deflection of the flexure element also subjects the strain gauges 4 and 5 to loads in an opposite sense. In a differential amplifier 8 the output voltage of the bridge circuit 6 is compared with a reference voltage $U_s$, which is adjustable via a voltage divider 7, and can simultaneously be read on a measuring instrument 10.

Via an amplifier 9 the output voltage V of the differential amplifier 8 is applied to the flexure element 1 as a control voltage V'. The control voltage increases as the deflection increases, so that as is shown in FIG. 2a, the force of application remains constant over a wide range of deflections. The curves a, b and c relate to different settings of the voltage divider 7. If the gain factor of the amplifier 8 or 9 is increased, the compensation force is also increased, which may even lead to overcompensation, as is represented by the characteristic of FIG 2b, which falls in the centre. This means that an increased deflection results in a reduced force of application. For specific measurements this may be desirable.

FIG. 3 finally represents the relationship between the deflection and the voltage supplied by the strain gauges. This is linear so that the voltage $U_{DMS}$ supplied by the strain gauges is suitable for determining the scanned profile.

What is claimed is:

1. An apparatus for measuring surface profiles comprising, a bilaminar ceramic flexure element supporting a test probe that is movable over a surface to be tested, the flexure element including means for generating a voltage which is proportional to the deflection of the flexure element, means for comparing the generated voltage with a source of reference voltage and for amplifying a difference voltage that results from the comparison of the generated and reference voltages, and means for applying the amplified difference voltage to the flexure element such that the applied force of the test probe on the tested surface is independent of the deflection of the flexure element.

2. An apparatus as claimed in claim 1 wherein said voltage generating means comprises, first and second strain gauges supported on the flexure element at a point located near a fixed support point of the flexure element, and a bridge circuit including said first and second strain gauges, said strain gauges producing a resistance variation proportional to the flexure element deflection which are converted into a corresponding voltage variation in said bridge circuit.

3. An apparatus as claimed in claim 1 or 2 wherein said comparing and amplifying means includes an amplifier having an adjustable gain factor.

4. An apparatus as claimed in claims 1 or 2 wherein the flexure element is made of an electrostrictive ceramic material.

5. An apparatus as claimed in claims 1 or 2 wherein the flexure element is made of a polarized piezoceramic material.

6. An apparatus as claimed in claims 1 or 2 further comprising means for adjusting the level of the reference voltage thereby to adjust the value of said applied force of the test probe.

7. A surface testing apparatus comprising a test probe movable over the surface to be tested and supported near one end of a bilaminar ceramic flexure element, said flexure element being supported at an opposite end thereof, means mechanically coupled to the flexure element for generating a voltage proportional to the deflection of the flexure element, a source of reference voltage which determines the value of applied force between the test probe and test surface, means coupled to said voltage generating means and said reference voltage source for comparing the generated voltage and the reference voltage to derive a difference voltage determined by the deflection of the flexure element, and means for applying said difference voltage to the flexure element so as to deflect the flexure element in a sense to maintain the applied force between the test probe and test surface relatively constant and independent of the deflection of the flexure element.

8. An apparatus as claimed in claim 7 wherein the comparing means comprises a differential amplifier, and the voltage generating means includes strain gauge means fixed to the flexure element and an electrical bridge circuit including the strain gauge means, said strain gauge means producing a resistance variation proportional to the flexure element deflection which is converted into a corresponding voltage variation in said bridge circuit.

9. An apparatus as claimed in claim 7 wherein said flexure element is adapted to be mounted so that it is deflected in a direction normal to the test surface and said difference voltage is applied to the flexure element so as to deflect same in said normal direction.

* * * * *